Figure 1:
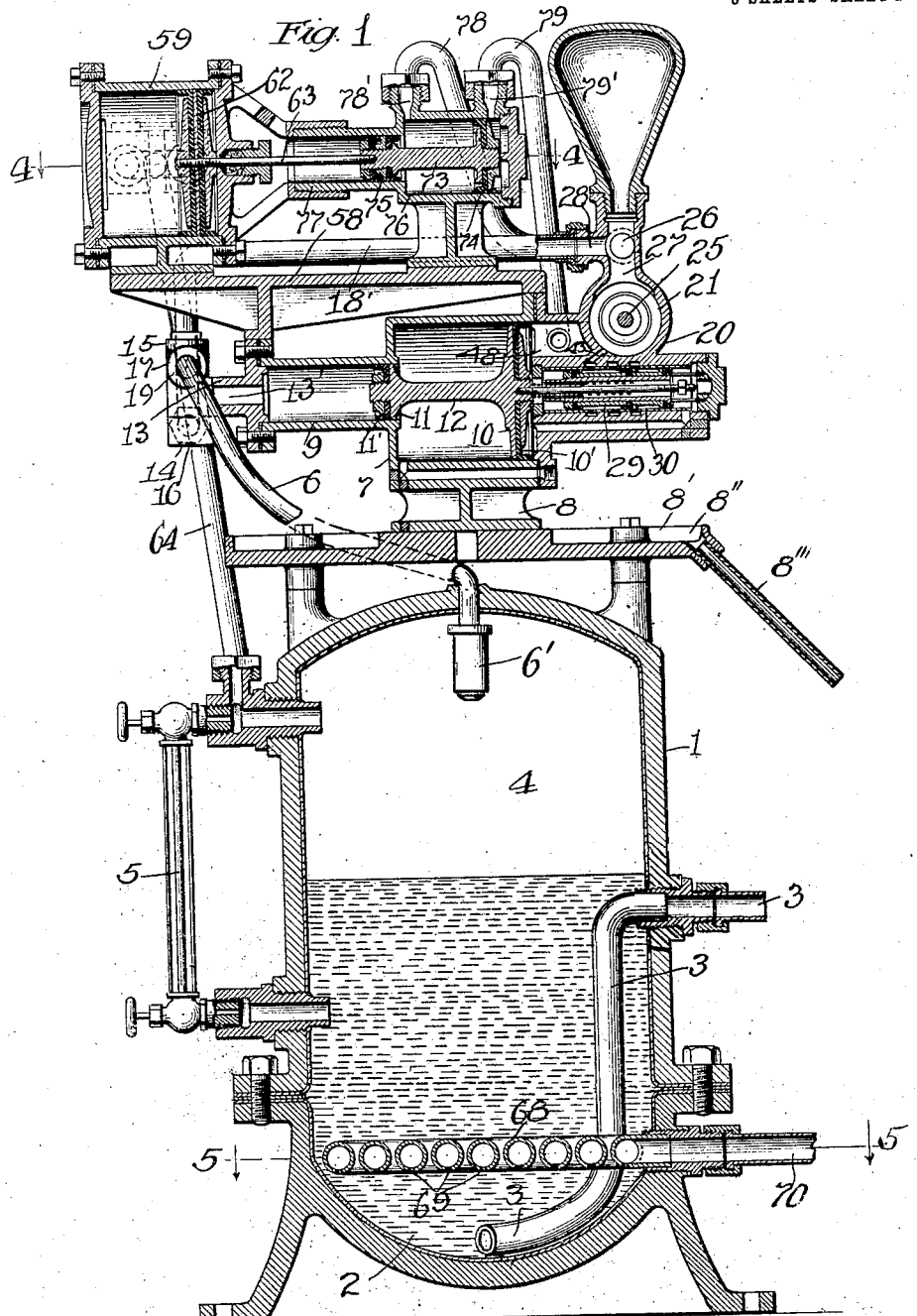

H. M. SMITH.
CARBONATING APPARATUS.
APPLICATION FILED SEPT. 2, 1909.

980,447.

Patented Jan. 3, 1911.
3 SHEETS—SHEET 1.

Witnesses
H. R. L. White
M. A. Kiddie

Inventor
Horace M. Smith
By Linthicum, Belt & Fuller
Attys

H. M. SMITH.
CARBONATING APPARATUS.
APPLICATION FILED SEPT. 2, 1909.

980,447.

Patented Jan. 3, 1911.

3 SHEETS—SHEET 2.

Witnesses
H. R. Lewhite
M. A. Kiddie

Inventor
Horace M. Smith
By Luithien, Belt & Fuller
Attys

UNITED STATES PATENT OFFICE.

HORACE M. SMITH, OF CHICAGO, ILLINOIS, ASSIGNOR TO THE LIQUID CARBONIC COMPANY, OF CHICAGO, ILLINOIS, A CORPORATION OF ILLINOIS.

CARBONATING APPARATUS.

980,447.  Specification of Letters Patent.  Patented Jan. 3, 1911.

Application filed September 2, 1909. Serial No. 515,780.

*To all whom it may concern:*

Be it known that I, HORACE M. SMITH, a citizen of the United States, residing at Chicago, in the county of Cook and State of Illinois, have invented new and useful Improvements in Carbonating Apparatus, of which the following is a specification.

In carbonating apparatus it has been the general practice heretofore to saturate the water with the gas by spraying or by agitation.

According to the spray system the water is discharged in a more or less finely divided state through a gas space in a mixing chamber in the bottom of which the supply of saturated water is maintained. The water is exposed only once to the gas while it is falling through the gas space and in practice it has been found impossible to obtain a highly charged water according to this system and a considerable quantity of gas has been practically lost.

According to the agitation system the gas is discharged into the water in the bottom of the mixing chamber and an agitator operates by power in the water to keep it in a state of agitation so that it will become saturated with the gas. According to this method a considerable quantity of gas escapes from the water into the gas space above the water and difficulty has also been experienced in highly charging the water.

Better results have been obtained by combining the spraying and agitation system but even then a considerable quantity of gas has escaped from the water. It has also been proposed to admit the gas through a perforated pipe at the bottom of the mixing chamber so that it will saturate the water in rising therethrough but here again much of the gas escapes from the water.

The object of my invention is to obtain a more complete and thorough saturation of the water with the gas and to maintain a supply of water in the mixing chamber more highly charged with gas than has been possible heretofore.

A further object of the invention is to maintain a circulation through the water of the gas which collects in the space above the water and thereby bring this gas repeatedly into contact with the water so that it will be taken up by a more thorough saturation and highly charge the water.

A further object of the invention is to reduce the power required for operating a carbonating apparatus by dispensing with the agitator and maintaining a circulation of the surplus gas through the water in a simple and novel manner. And a still further object of the invention is to operate the water motor and the gas circulating pump by one set of valves which admit water to and exhaust water from the power pistons of the motor and pump and thereby simplify the construction and arrangement of parts and reduce the power required to operate the valves.

I have illustrated one embodiment of the invention in the accompanying drawings, in which—

Figure 2:
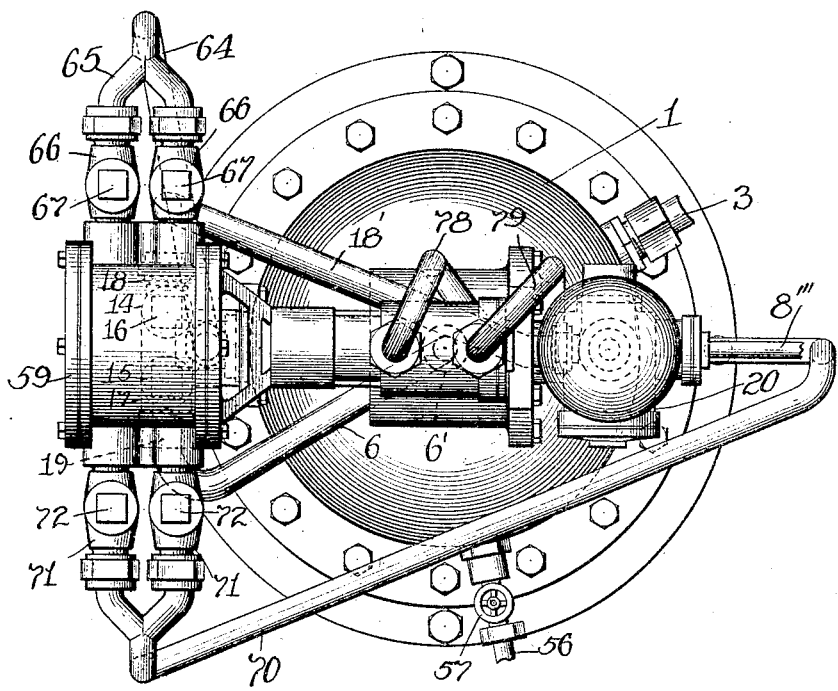
Figure 3:
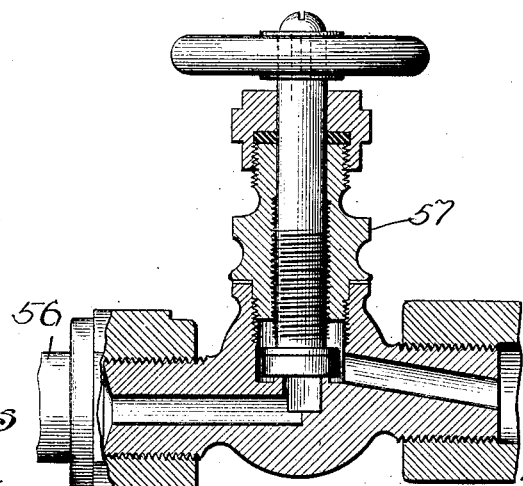
Figure 4:
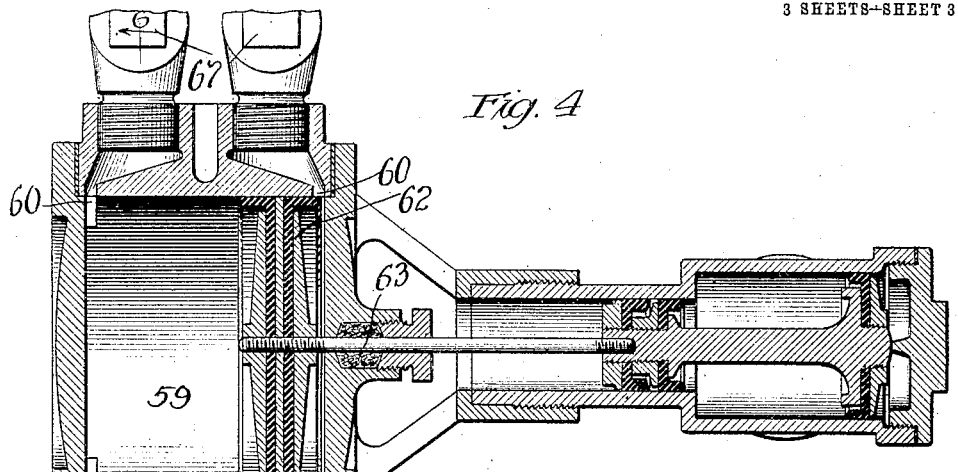
Figure 5:
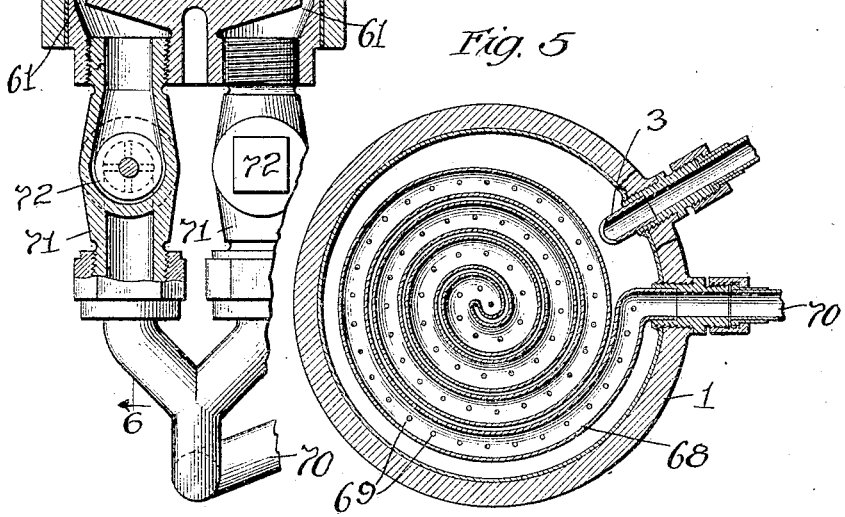
Figure 6:
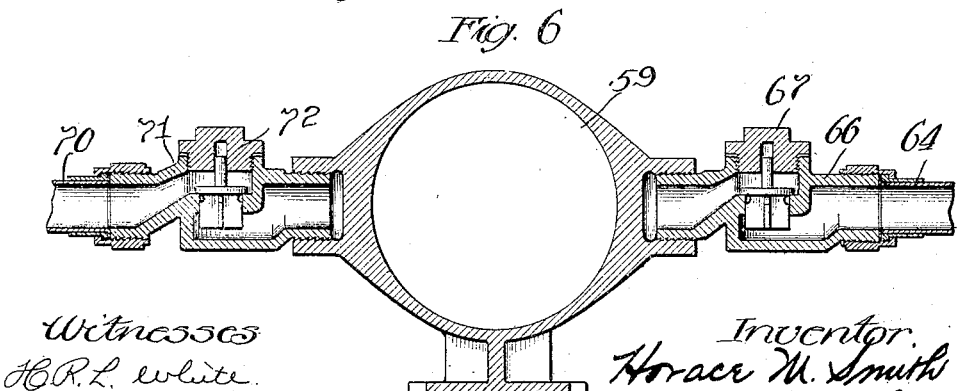

Figure 1 is a sectional view of a carbonating apparatus embodying the invention. Fig. 2 is a top plan view of the apparatus. Fig. 3 is a detail enlarged view of the gas valve. Fig. 4 is a horizontal sectional view on the line 4—4 of Fig. 1 and showing the gas pump. Fig. 5 is a horizontal sectional view on the line 5—5 of Fig. 1, showing the gas discharge coil. Fig. 6 is a vertical sectional view on the line 6—6 of Fig. 4.

In the drawings, 1 designates a mixing tank which is adapted to hold the supply 2 of charged or carbonated water which is drawn off from the bottom of the tank through the pipe 3. The space 4 in the mixing tank above the water therein constitutes the gas chamber in which the gas not taken up by the water collects. The tank may be provided with a water gage 5 and any other attachments desirable in apparatus of this character and the tank may be made in any suitable manner adapted for the purposes herein set forth.

Various means may be employed for supplying water to the mixing tank and the water may be admitted to the lower part or to the upper part of the tank. I prefer, however, to admit the water at the top of the tank through a pipe 6 and provide a spraying device 6' at the discharge end of the pipe for spraying the water into the tank through the gas chamber 4. This construction is preferred to that in which the water is admitted to the bottom of the tank because an opportunity is afforded the water to take up some of the gas while it is falling through the gas chamber. I have used both constructions, however, and find them both satisfactory but I believe that the spraying system embodied with my invention as herein shown and described insures better results, especially where the discharged water is rapidly drawn off from the mixing tank.

In the drawings I have shown the pressure multiplying water motor forming the subject matter of my application Serial No. 515,781 for supplying water to the mixing tank and as this water motor forms no part of the present invention it will not be necessary to describe it in detail. The water motor comprises a power cylinder 7 mounted on a base 8 which is supported on a bed 8' suitably mounted on top of the mixing tank. This bed has a trough 8'' to receive drippings from the water motor, and a drain pipe 8'''. A high pressure cylinder 9 is centrally disposed at one end of the power cylinder and communicates therewith. A differential piston is arranged to operate within these cylinders and it comprises the power piston 10 and the high pressure piston 11, these two pistons being connected by a stem 12 and each provided with cup leathers 10' and 11' respectively. A connection 13 is made fast to the outer end of the high pressure cylinder 9 and is provided with a passage 13' which communicates at one end with the high pressure cylinder and has two branches 14, 15, at its other end. A suction valve 16 is arranged in branch 14 and a delivery valve 17 is arranged in branch 15. The connection has an inlet 18 to which a water pipe 18' is attached and an outlet 19 to which is attached the water pipe 6 which discharges into the mixing tank. The admission and supply of water to and from the power cylinder is accomplished by a differential piston valve 25 operating in a casing 20 made fast to that end of the power cylinder opposite the high pressure cylinder. The casing has a main water inlet opening 26 which communicates through a passage 27 with the chamber 21 which is located between the two pistons of the motor valve. The inlet opening 26 also communicates through a nipple 28 with the pipe 18' which supplies water to the high pressure cylinder 9.

The supply of water to and exhaust from the power cylinder 7 is regulated and controlled by a pilot valve 29 which operates in a valve chamber 30 in the casing 20 below the motor valve and connected with the chamber 21 by a passage 43. The water motor is operated by water under city pressure or any other pressure. The high pressure cylinder 9 and the chamber 21 between the two pistons of the differential piston 25 of the motor valve are filled with water and this valve is actuated by the water to admit water from the chamber 21 through the passage 43 and thence to the power cylinder behind the piston 10. Thus the differential piston 10, 11, of the pump is actuated and the water in the high pressure cylinder 9 is forced out through the connection 13 and pipe 6 to the mixing tank. Provision is made for shifting the pilot valve to the left (Fig. 1) as the piston 10 approaches the end of its forward stroke and the water which has operated the motor valve is permitted to escape so that valve may resume its initial position. Then the water behind the piston 10 in the power cylinder is permitted to escape and the pressure of the supply water opens the valve 16, fills the high pressure chamber 9 and returns the pistons 10 and 11 to initial position. This brief explanation of the operation of the water motor will be sufficient for a general understanding thereof and reference may be had to my concurrent application aforesaid for a more detailed description of the construction and explanation of the operation. The water supply to the water motor may be regulated automatically by any of the means commonly employed in the art for regulating the water supply, or by other suitable means, or it may be regulated by hand.

Gas is admitted to the mixing tank from a suitable source of supply through a pipe 56 which may be connected to the mixing chamber above or below the level of the water therein and a valve 57 (Fig. 3) is preferably located in this gas pipe adjacent to the tank to control the supply of gas to the tank.

As heretofore stated, more or less gas which has not been taken up by the water in any of the saturation methods heretofore employed will collect in the mixing tank above the level of the water. My invention contemplates the repeated circulation of this surplus gas through the water in the mixing tank and thus by repeatedly bringing the gas into contact with the water obtaining a more thorough and complete saturation of the water with the gas. Different means may be employed for producing this circulation of the surplus gas. In the drawings I have illustrated a pump which is operated by water controlled by the same set of valves which admit the water to and exhaust it from the power piston of the water motor. I have shown the gas pump mounted for convenience on a base 58 which is fastened in any suitable manner on top of the water motor, or it may be otherwise conveniently supported above and preferably on the mixing tank (Fig. 1).

I preferably employ a double-acting gas pump comprising a cylinder 59 having inlet ports 60 and outlet ports 61. A piston 62 is carried by a stem 63 and is arranged to operate in the cylinder 59. A gas pipe 64 is connected at one end to the mixing tank at any suitable part thereof above the level of the water in the tank and its other end is branched at 65 and connected with the connections 66, which are provided with valves 67 and communicate with the inlet ports 60 of the cylinder 59. A pipe coil 68 is located within the mixing tank at the bottom thereof and this coil is provided at the bottom with a plurality of perforations 69. The pipe coil through which the surplus gas from above the water in the mixing tank is distributed in a finely divided state in the water at the bottom of the mixing tank is connected by a pipe 70 with the connections 71 which are provided with valves 72 and communicate with the outlet ports of the cylinder 59. As the piston 62 is reciprocated in the cylinder 59 the gas is sucked into the cylinder from the gas chamber 4 above the water in the mixing tank and delivered through the pipe 70 to the distributing coil from which it is discharged to rise in a finely divided state through the water in the tank.

The piston 62 may be operated by any suitable means, but, as before stated, I prefer to operate it by power derived from the water which is employed in operating the water motor. For this reason I provide a differential piston 73 comprising a large power piston 74 and a small piston 75 which operate in cylinders 76, 77, mounted on the base 58. The stem 63 of the piston 62 is connected to the differential piston 73. A pipe 78 is connected to the cylinder 76 at 78' behind the piston 74 and to the pipe 18' or the nipple 28 of the water pump in any suitable manner to admit water from the supply which operates the water motor to the cylinder 76. A pipe 79 is connected at 79' to the cylinder 76 in front of the piston 74 and to the passage 48. As the piston 74 is of greater area than the piston 75 the inflow of water from the source of supply through pipe 78 into cylinder 76 will move the differential piston 73 to the right in Fig. 1 and thus move the piston 62 in the cylinder 59 in the same direction. This occurs at the same time that water from the source of supply is admitted behind the piston 10 of the water motor. When the water behind the piston 10 of the water motor is exhausted through the passage 48, as heretofore explained, the water behind the piston 74 will also be exhausted through the pipe 79 and the passage 48. Thus these two differential pistons of the water motor and gas pump are operated simultaneously, water is taken from the same source of supply for their operation and the admission and exhaust of water to both of the power pistons is controlled by one set of valves heretofore described as comprising a part of the water motor. I have found this means for producing a repeated circulation through the water in the mixing tank of the surplus gas which collects in the gas chamber above the water in the mixing tank to be very satisfactory in practice but other means may be employed if desired.

My invention repeatedly distributes the surplus gas in a finely divided state through the water in the mixing tank so that opportunity is repeatedly afforded for saturating or charging the water with this gas and while the decrease of the quantity of gas required for charging the water is of material importance the principal result sought is to charge the water as highly as possible with the gas at a minimum expenditure of power. My invention dispenses entirely with the agitator which has frequently been used as a means for mixing the water and gas in a carbonating machine and saves the power required for operating the agitator. My invention also enables me to more thoroughly charge the water with gas than is possible with the spray or the agitator systems, separately or combined, heretofore employed because it provides for repeatedly distributing the gas through the water so that the water has repeated opportunity for taking up the gas, and it does not break up and agitate the water as an agitator would and which tends to liberate a considerable quantity of gas from the water.

My invention is simple in construction and operation, inexpensive to make and install, and it is capable of being embodied in a variety of forms as may be desired. My invention also enables the use of a small carbonating apparatus in places where a large apparatus has heretofore been used because it is capable of maintaining a constant supply of highly charged water in small volume and this is particularly true where automatic means are employed for regulating the supply of water.

When an agitator is used the mean level of water in the mixing tank should be maintained close to the height of the shaft of the agitator in order that the agitator may attain its maximum effect but with my invention it is not necessary to maintain the water level at any specified height and thus I am enabled to reduce the size of the mixing tank materially. By eliminating the agitator and the power required for operating it the cost of manufacture and installation of a carbonating machine is very materially reduced.

By "surplus" gas in this application I mean the gas which does not combine with the water but collects in the gas chamber above the water in the mixing tank.

What I claim and desire to secure by Letters Patent is:

1. In a carbonating apparatus, the combination of a closed mixing tank, means for supplying gas to the tank, a water motor for supplying water to the tank, a gas pump connected with the tank above and below the level of the water therein to deliver the surplus gas which collects in the tank above the water to the tank below the water level, a power piston in the water motor, a power piston in the gas pump, and means for operating both of said pistons by water from the same source of supply.

2. In a carbonating apparatus, the combination of a closed mixing tank, means for supplying gas to the tank, a water motor for supplying water to the tank, a gas pump connected with the tank above and below the level of the water therein to deliver the surplus gas which collects in the tank above the water therein to the tank below the water level, and a single set of valves for controlling the supply of water from a single source to operate the water motor and the gas pump simultaneously.

3. In a carbonating apparatus, the combination of a closed mixing tank, a reciprocating pump for supplying water to the tank, means for supplying gas to the tank, a reciprocating gas pump, means actuated by the water pump for controlling the motor fluid which actuates both the water pump and the gas pump, so that said pumps operate synchronously, a pipe connecting the gas pump with the tank above the level of the contained liquid therein, a perforated coil submerged in the liquid in the tank, and a pipe connecting said coil with the gas pump whereby the surplus gas above the liquid in the tank may be forced by the gas pump into the submerged coil in the bottom of the tank where it will escape through the perforations in the coil and be disseminated through the liquid in the tank.

HORACE M. SMITH.

Witnesses:
W<small>M</small>. O. B<small>ELT</small>,
M. A. K<small>IDDIE</small>.